United States Patent [19]

McReynolds

[11] 4,034,487
[45] July 12, 1977

[54] AUTOMATED TESTING STATIONS

[76] Inventor: John D. McReynolds, P.O. Box 267, Kittredge, Colo. 80457

[21] Appl. No.: 555,972

[22] Filed: Mar. 6, 1975

[51] Int. Cl.² .......................................... G09B 5/02
[52] U.S. Cl. ............................... 35/48 R; 35/48 A
[58] Field of Search ................. 35/6, 8 R, 9 R, 9 A, 35/9 B, 9 D, 9 E, 9 F, 30, 31, 35 C, 48 R, 48 A, 48 B; 235/61.1 E, 61.12 R; 346/86

[56] References Cited

U.S. PATENT DOCUMENTS

| 3,541,699 | 11/1970 | Baker | 35/9 A |
|---|---|---|---|
| 3,596,286 | 7/1971 | Coliz et al. | 346/86 |
| 3,609,880 | 10/1971 | Arbon | 35/48 B X |
| 3,628,255 | 12/1971 | Golden | 35/48 R X |
| 3,689,930 | 9/1972 | Strickland | 35/8 R X |
| 3,727,326 | 4/1973 | Holmes | 35/9 A |
| 3,775,864 | 12/1973 | Bisinger et al. | 35/9 A |
| 3,894,346 | 7/1975 | Ward et al. | 35/6 X |

Primary Examiner—Richard C. Pinkham
Assistant Examiner—Vance Y. Hum
Attorney, Agent, or Firm—Head, Johnson & Chafin

[57] ABSTRACT

An automated testing apparatus in which the entire control and report is carried in a single, multiple-column computer punch card. Each of the twelve horizontal rows of the card provide opportunity to record one of up to four possible answers to a given question, to prepunch into the card a binary number corresponding to that of the correct answer, and a number up to 100, in binary form, for the selection of a selected slide out of a plurality of slides. The apparatus comprises a slide projector with a slide holder, each of the slides carrying information concerning a specific question, four possible selected answers, and one correct answer. There is a card punch/reader, which can read any of the prepunched spaces, and under control of the student or other person being tested, can punch in any one of four rows. Each column of the punched card concerns a separate question, a separate slide, separate suggested answers, and a separate correct answer. A selected group of columns can comprise a first test, another group of column a second test, etc. up to the total of 80 columns maximum, in the commercial punched cards. The card punch/reader is capable of remote controlled punching in a selected number of rows, and can read, by photoelectric devices, a selected number of prepunched holes in a selected number of rows. A group of up to four or more answer. Select Push Buttons are provided for the student to select one of four suggested answers.

7 Claims, 3 Drawing Figures

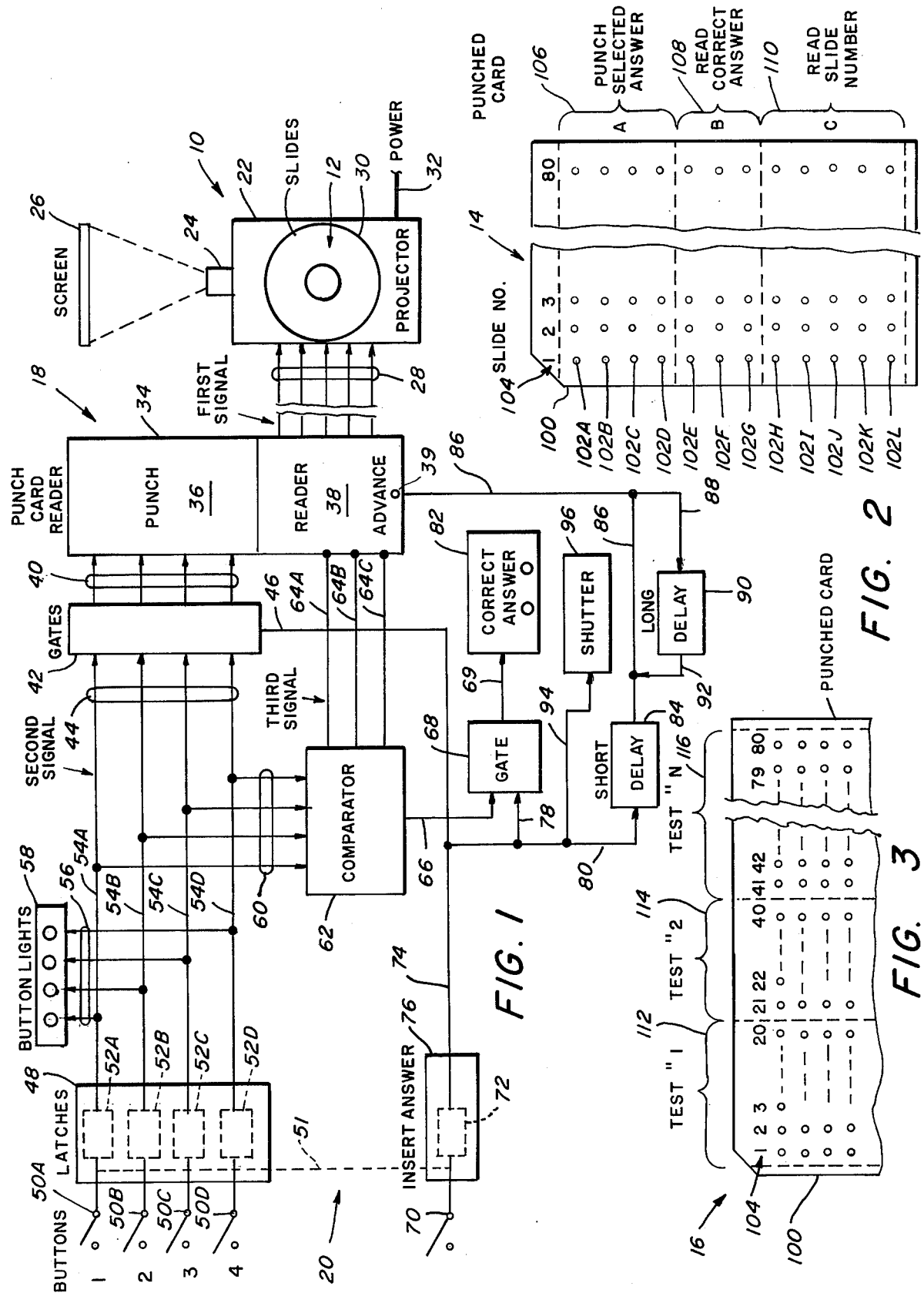

AUTOMATED TESTING STATIONS

BACKGROUND OF THE INVENTION

This invention lies in the field of electronic testing apparatus. More specifically, it concerns a kind of testing apparatus in which a projector is instructed to expose and project a selected slide in its carousel. The projected slide shows a selected question, and three or four or more possible answers. The student or other person being tested will then select a button corresponding to the number of the answer which he believes is correct, and will insert his answer by pressing another button. A comparison will be made of the selected answer as compared to the true answer read by the card reader, and the selected answer will be punched into the card.

Still more particularly, this invention relates to types of testing apparatus in which a slide is projected which carries a question and a plurality of possible answers. The student is required to select one of the indicated answers as the correct one, and to press the corresponding button. His answer is recorded by punching into a card, the card reader moves to the next column, instructs the projector to select a new slide, and the operation is repeated.

In the prior art there are a number of designs of apparatus for testing, of the general type covered by this application. However, these are considerably more complicated, primarily because they involve a slide projector which sequentially goes from one to the next slide. In these systems the correct answer must be supplied from the slide projection by appropriately coding the slides. This means that each slide must be coded photoelectrically or otherwise, so as to indicate the correct answer. This is cumbersome and difficult to provide, and involves additional expense, etc.

SUMMARY OF THE INVENTION

It is a primary object of this invention to make a simply controlled and operated testing apparatus, in which all of the controls are provided on a prepunched and coded computer punch card. A plurality of independent tests can be handled on each of the cards so long as the total number of questions included is less than 80.

It is a further object of this invention to provide the control of the operation, including the selection of a particular slide, and the determination of the correct answer, both of which are read from prepunched holes in the punch card, and to record in other spaces on the card the answer selected from the student.

These and other objects are realized, and the limitations of the prior art are overcome in this invention, by providing in a single computer punch card prepunched information regarding a particular slide number associated with a particular question, prepunched information concerning the correct answer to the selected question, and means for punching in the same column the number of the answer selected by the student.

The projector that is used is controlled by the card reader and is designed so as to expose any one of its 100 possible slides, on the presentation of a binary coded signal from the card reader. Thus, by prepunching in a given column such a binary coded signal, any one of 100 slides can be displayed on the screen. The particular slide chosen for a given test can be selected at random from the 100 slides. The 80 possible maximum columns on the card can be divided into groups, each group including the slides corresponding to a selected test subject. There can also be slides common to two or more of the tests, which are called for by the test prepunching into the card. This provides a very flexible type of control whereby simple prepunching of the cards for the selected slides, they can be presented in any selected sequence.

Once punched into the test card, the carrying out of the test is automatic. The test starts with inserting the card into the card punch/reader, into the first column. As soon as it is exposed, the rows corresponding to the binary number of the desired slide are read. This is communicated to the projector, which selects the proper slide and displays it on the screen. The slide contains three groups of statements. The first is a statement of the question, the second is a statement of a plurality of possible answers, and the third is a statement of the correct answer. A shutter is provided to cover the statement of the correct answer, and at the end of the selection by the student the shutter is lifted, and the correct answer is exposed. A timer is provided to expose the correct answer for a selected time, after which a signal goes to the card punch/reader to move to the next column. A second question slide is selected and exposed, etc.

BRIEF DESCRIPTION OF THE DRAWINGS

These and other objects and advantages of this invention, and a better understanding of the principles and details of the invention, will be evident of the following description taken in conjunction with the appended drawings in which:

FIG. 1 represents a schematic diagram of the entire testing apparatus, including the random access projector, the card punch/reader, and the manual controls operated by the person taking the test.

FIG. 2 shows a portion of the computer punch card in which sections of the columns are shown, in which the answers made by the student are punched, and other rows in which are prepunched the correct answer and the slide number.

FIG. 3 shows a portion of the punch card in which selected columns can be assigned to one or more separate tests.

Referring now to the drawings, there is shown schematically an overall diagram of the apparatus of this invention. There is indicated generally by the numeral 10 the projector, by the numeral 12 the slide container or carousel which is preloaded with up to 100 separate slides, each one indicated by an appropriate number. Numeral 14 indicates generally a portion of the computer punch card and describes certain portions of each of the rows which are devoted to areas for punching the selected answer. A portion A of the columns is devoted to punching the selected answer. Another portion B is devoted to prepunching a binary number corresponding to the correct answer and another portion C corresponds to a binary number indicative of the particular slide to be selected by the projector and displayed.

The numeral 16 indicates generally another portion of the computer card in which various columns are shown up to a maximum of 80, which can be divided up in any desired manner into a plurality of separate tests. The numbers of the corresponding slides are punched into the individual columns of that group of columns.

The key to the entire testing operation is a card punch/reader indicated generally by the numeral 18. The numeral 20 indicates generally the manual push button apparatus and the electronic circuitry between the manual apparatus and the card punch/reader.

While any number of selected answers can be provided, and any number of slides can be used in any one test, it is convenient to divide up the twelve possible column positions, or rows, on the punch cards, in a way such as the following. It is possible, for example, to provide four rows for the punching of the selected answer. In other words, the slide will display a question and four possible answers, and the student will respond by punching one of four push buttons. Whichever push button is pushed, the card punch will record that number in one of four of the rows of a given column.

The correct answer, which is one of four possible answers, can be stored in binary form by three perforations in the column, which are prepunched. Therefore, photoelectric means which detect the presence of perforations in one or more of these three rows, will indicate the correct answer. A possible five additional perforations can be provided in each column, so that the presence of perforation in one or more of the five positions will indicate a binary word corresponding to a number up to 31, which would be the number of the selected slide in the carousel.

Assuming that this is the division of the twelve possible storage positions on each column of the card, the circuitry of the apparatus indicated generally by the numeral 20, includes a group of four buttons numbered 1, 2, 3 and 4, corresponding to the numbers of the suggested answers. These buttons 50A, 50B, 50C and 50D each go to one of the four latches 52A, 52B, 52C, 52D in a box 48. These latches may, for example, be flip flops. When a button 50A is pushed, for example, the latch 52A will be set, and this will place a voltage on the lead 54A. Over the leads 56, it will light a corresponding light in the assembly of Button Lights 58 indicating that push button 50A has been closed.

The lead 54A goes onto a set of gates 42, one for each of the four lines 54A, 54B, 54C, 54D. These gates are enabled by the signal from the corresponding latches 52. Later when a signal comes in on lead 46 to the gates 42, the appropriate lead corresponding to the set latch then sends a signal to the punch 36 in the punch/reader 34 to punch an opening corresponding to the particular switch 50 that was closed.

Once the student has made a selection of the switches 1, 2, 3 and 4, he then presses an Insert Button 70, which will insert his answer into the apparatus. However, before he pushes the button 70 he can change his selection of the answers 1, 2, 3 and 4 by pushing a different numbered button. This will reset the previous latch and set a new latch corresponding to the new selection. This interlocking of the latches is indicated by the dashed line 51 which ties together the various latches 52A, 52B, 52C, 52D and the latch 72 corresponding to the insert answer switch 70 in the box 76.

The type of interlock which is provided in the latch box 48 is well-known and needs no further description. A man skilled in the art of binary logic knows, and there are text books which provide full information on, such simple latching as has been described in regard to the box 48, and the latches such as flip flops, etc.

After the student has made his final selection with the buttons 1, 2, 3 or 4, he then pushes the button 70. This sets the latch 72 and puts an appropriate voltage on lead 74 which does several different things. First of all, it puts a control voltage on lead 46 to the gates 42 and permits the gate which was previously enabled by closing of the proper switch 50, to pass through the gate and control, by means of leads 40, the punch 36, which will punch in one of the four rows corresponding to which of the four switches 50 has been closed. Also, by lead 78 the signal on line 74 in cooperation with a signal on lead 66 will close the gate 68 and put an appropriate voltage on lead 69 to expose one of two possible signal lights 82, to tell whether the answer selected by the student is correct or incorrect.

The way this is done, is to read out from the card punch/reader the signal on the group B perforations, which as has been selected as, say, three perforations. These perforations are read photoelectrically and appropriate signals are put out from the reader on leads 64A, 64B and 64C, which has been called a "third signal," and goes to a comparator 62. There are four other leads from the lines 54 grouped as leads 60 to the comparator. Voltage on an individual one of the leads 60 corresponds to the student's selection of an answer, and the appropriate voltages on one or more of the leads 64 correspond to the true answer. The comparator makes a comparison between the two signals and if the selected answer is the correct one, then an appropriate voltage is placed on the lead 66 to enable the gate 68. Then, when the insertion button 70 is pushed, the voltage on leads 78 and 69 will control the gate to signal the correct or incorrect answer on 82.

As explained previously, each of the slides has three sections. The top section is a printed question. The middle section is a printed series of four suggested answers. The bottom section is the printed correct answer. The bottom section is normally covered by a shutter so that when the side is first exposed, the student can only read the question and the suggested answers. After he has made his selection and inserted the answer into the system, the shutter 96 lifts to expose the lower section of the slide, which carries the true answer. This shutter is operated by a simple solenoid, which, with a preamplifier controlled by the signal on 94, is in a manner which is conventional and well-known in the art.

The comparator 62 is a conventional piece of apparatus which is used very frequently in electrical logic circuits where a presented signal is compared with a preset signal. When there is identity, a control voltage appears. Such comparators can be purchased on the open market and are made by most, if not all of the solid state device manufacturers, and need no further description at this time.

There is a further lead 80 joined to the lead 74 from the switch 70, that goes to a short delay device 84. This has a controlled time delay of up to 10 or 20 seconds or such selected time, after which a voltage appears on the lead 86 going to the card punch/reader terminal 39 which tells it to advance to the next column of the card.

The normal sequence of operations is for the card punch/reader to read the card and transmit to the projector the number of the desired slide. The slide is selected and projected. The student then reads the question and suggested answers, and makes a selection by pushing appropriate buttons 50, and puts into the comparator 62 a signal on leads 60 corresponding to the answer selected. At the same time the card reader puts out a signal on leads 64 carrying the true answer, and the comparator 62 then makes a comparison. If the answer selected is correct, it enables the gate 68 to pass the signal on lead 78 to show the correct answer. If the comparison is not identical, then a different signal is placed on the lead 66, which provides a different answer to the box 82 over lead 69 and an incorrect answer light is shown.

The signal from the inserted answer box 76 goes through lead 74 and through lead 94 to a shutter 96 which blocks off the third and lowest section of the slide, namely the correct answer. As soon as the button 70 is pushed, the correct or incorrect answer is shown by the lights on the box 82 and the shutter 96 is lifted, exposing the true answer.

After the button 70 is pushed and the shutter is lifted, a short time delay box 84 becomes active and after a selected short interval of time which may vary from 10 to 20 seconds as desired. After this time interval, a signal goes by lead 86 to the card reader 38 and tells it to advance to the next slide. This movement to the next slide resets all of the latches 52 and 72.

If the student reading the slide does not know the answer, he is given a selected long time delay set by box 90. If within that long time interval, which may, for example, be 1, 2 or 3 minutes, then the card reader is signalled to advance, even though the button 70 has not been pushed. There has been no punch into the rows A of the card 100 and the absence of a punch in the rows A indicated that the student had made no decision as to the correct answer. The long time delay box 90 receives its impulse to start counting from the time that the advance signal is sent to the card reader. In other words, when the card is advanced to the next column by signal on line 86, the new slide is selected and projected. The long delay box 90 starts counting. At the end of a selected time it puts out a signal on line 92 to line 86, to advance the card reader to the next column. Such delay boxes as 84 and 90 are well-known in the art and need not be described further.

Referring now to FIG. 2 there is shown a portion of a conventional computer punch card indicated generally by the numeral 14. This comprises a paper card 100 with a series of columns 1, 2, 3 . . . 80. Each of the columns contains 12 possible positions indicated by the small circles 102A 102B and 102C...102L.

By some preselection, a first group of rows identified by the letter A are selected for the punch 36 to punch one of, say, four possible locations with a perforation indicative of which push button 50 has been closed. A second group of possible rows B are selected, and are prepunched according to the number of the correct answer on a binary code. A third group of rows C are selected or punched in binary code to indicate the number of the slide which has been selected to be projected.

In FIG. 3 is shown another view of a part of a conventional computer punch card 100 in which the columns 1, 2, 3 . . . 80 are divided up into groups of any selected number of columns, such as 20 more or less, so that it is possible to prepunch and to control the slides in the carousel 12 in various groups, in accordance with various tests, such as test No. 1, 112, test No. 2 indicated by bracket 114, and test No. N indicated by bracket 116, for example. Having preprogrammed, said five tests on a card with all of the slides corresponding to the five tests arranged in the carousel, and with appropriate slide numbers punched into each of the columns, then the same card can be given to five different students and they can each carry out a different test by starting the test at the appropriate column on card. In other words, test No. 1 would be carried out by inserting the card into the card reader and starting at column 1. Someone taking the second test would set the card at column 21.

The projector has the capability of selecting a given slide when an appropriate first signal has been sent to it on leads 28, carrying a binary word corresponding to the particular slide number. The projector will search the carousel for the slide and will project the proper slide. In that respect this testing system differs from all others, in that the test does not have to be carried out sequentially from slide No. 1 to slide No. 2, etc. on the carousel.

It is even possible to include a given slide in one or more of the several tests preprogrammed on the card. For example, if there are one or more slides which describe the general procedure of the testing, and shows an example or two, there is no need to duplicate these slides for each of the tests since in programming the tests, each one will call for that sequence of beginning slides, and then will go into the specific slides concerning the subject being tested.

The slide projector which has been used in this invention is one which is commercially available, although there may be others which provide the same type of procedure of random selection of slides. This is a slide projector indicated generally by the name GAF ESP 2000 RANDOM ACCESS PROJECTOR. It is manufactured by the GAF Corporation, 140 West 51st Street, New York, N.Y. 10020.

The card punch/reader is a commercially available punch identified by the name WRIGHT PUNCH MODEL 2600. While this particular model is a hand operated card punch, it has been modified by removing a group of punches, leaving only those concerned with the rows A. Rows B and C are fitted with small light sources and photoelectric sensors such as LED's and corresponding photo resistive devices, which are available and well-known by the man skilled in the art. These are small enough to be used in the close spacing of the rows and columns of the conventional computer card.

The card punches are operated by solenoids, which are commercially obtainable and operated by the leads 40 through appropriate transistor amplifiers, as is well-known in the art. Also the control button 39 which is used to advance the card one position has been automatized by means of an appropriate solenoid, so that the signal on lead 86 will so advance the card by one column.

The Wright punch is available from the Wright Line Company, a division of Barry Wright Corporation, 160 Gold Star Boulevard, Worcester, Mass. 01606. The Wright Line Company is now preparing to manufacture, as a commercial item, a combination card punch and reader such as described in this invention.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. Automated fully portable testing apparatus comprising:
   a. automated slide projector means including means responsive to the receipt of a first binary coded signal to select a slide corresponding to said first binary coded signal and to display said slide;
   b. a plurality of slides each carrying a selected question and a group of A possible answers, one of which is the correct answer to the selected question, said slides mounted for selection and projection in said projector means;
   c. punched card means containing a selected plurality of N possible columns for punching, each column containing a plurality of P possible rows in which said card can be punched, said group of P rows comprising:
      1. A group of A rows into one of which, responsive to a second binary coded signal, a hole can be punched corresponding to one of said A possible answers;
      2. a group of B rows into one of which at least one hole is prepunched, corresponding in binary coding to the correct answer and producing a third binary coded signal when sensed;
      3. a group of C rows into which at least one hole is prepunched, corresponding in binary coding to the number of a question, and of the corresponding slide, to be selected and producing a first binary coded signal when sensed;
   d. portable combination card reading and punching means capable of holding and advancing said punched card means, and means to simultaneously read and punch on different rows in the same column of said punched card means, and including;
      1. means in response to said second binary coded signal, to punch a hole in at least one of said A rows, in a selected column K;
      2. means simultaneously to read the position of said punched holes in one, or more of said B rows of said same column K, corresponding to the correct answer, and means to transmit a third binary coded signal corresponding to said correct answer;
      3. means simultaneously to read the C rows of said same column K and to transmit to said projector means said first binary coded signal corresponding to which of the C rows contain punched holes; and
   e. logic means including;
      1. a plurality of A push button means corresponding in number to the number of possible answers, and means responsive to said push button means to generate said second binary coded signal;
      2. single insertion push button means, and means responsive thereto to transmit to said card combination reading and punching means said second binary coded signal, whereby a hole is punched in a selected one of said A rows;
      3. comparator means responsive to said third binary coded signal and to the selected push button to determine whether the selected answer is the correct one, and responsive thereto, means to display the result of said determination;
      whereby the same punched card that carries the test program, step by step, in separate columns of the card, also carries in other rows, in those same columns, perforations punched in the course of the testing, providing results of the testing.

2. The apparatus as in claim 1 including latch means corresponding to each push button means, and interlock means whereby only one latch can be set at one time.

3. The apparatus as in claim 1 including means responsive to said comparator means and said insertion push button means to indicate whether the selected answer is correct or incorrect.

4. The apparatus as in claim 1 including means responsive to said insertion push button means to display the true answer.

5. The apparatus as in claim 4 in which said means to display said true answer comprises means to remove a shutter means masking a portion of the display of said slide.

6. The apparatus as in claim 1 including means responsive to said insertion push button means to start a first time delay means, and means at the end of a selected time delay to signal said card reader to advance said card one column.

7. The apparatus as in claim 1 including second time delay means responsive to the signal to advance said card one column, to apply a signal at the end of a selected delay to advance said card one column.

* * * * *